Jan. 6, 1970 J. I MONTAGU Re. 26,749

ELECTRIC MOTOR FOR LIMITED ROTATION

Original Filed Jan. 10, 1963 5 Sheets-Sheet 1

INVENTOR.
BY Jean I. Montagu
Blair & Buckles
Attorneys

Jan. 6, 1970 J. I. MONTAGU Re. 26,749

ELECTRIC MOTOR FOR LIMITED ROTATION

Original Filed Jan. 10, 1963 5 Sheets-Sheet 2

INVENTOR.
BY Jean I. Montagu
Blair E. Buckles
Attorneys

INVENTOR.
BY Jean I. Montagu
Blair & Buckles
Attorneys

ELECTRIC MOTOR FOR LIMITED ROTATION

Original Filed Jan. 10, 1963 5 Sheets-Sheet 4

INVENTOR.
BY Jean I. Montagu

Blair & Buckles
Attorneys

INVENTOR
JEAN I. MONTAGU
BY
Blair, Buckles & Cesari
ATTORNEYS

United States Patent Office

Re. 26,749
Reissued Jan. 6, 1970

26,749

ELECTRIC MOTOR FOR LIMITED ROTATION

Jean I. Montagu, Boston, Mass., assignor to Mechanics for Electronics, Inc., Cambridge, Mass.

Original No. 3,177,385, dated Apr. 6, 1965, Ser. No. 250,696, Jan. 10, 1963. Application for reissue Feb. 27, 1967, Ser. No. 626,351

Int. Cl. H01f 7/08

U.S. Cl. 335—229 30 Claims

Matter enclosed in heavy brackets [ ] appears in the original patent but forms no part of this reissue specification; matter printed in italics indicates the additions made by reissue.

ABSTRACT OF THE DISCLOSURE

*A motor has a rotor mounted for rotation about an axis and first and second poles, each having a pole face describing in section an arc of a circle having its center on the axis. The rotor has a first surface closely radially spaced from the face of the first pole by a first gap and a second surface closely radially spaced from the face of the second pole by a second gap. Each of the first and second rotor surfaces describe in section an arc of a circle whose center is also on the same axis. The first pole has an axially extending gap in its face which divides it into first and second pole pieces. The first surface of the rotor extends across this third gap in the first pole opposite both the first and second pole pieces. A first magnet is connected between the first and second poles so as to pass a first magnetic field through the rotor by way of the first and second poles and the first and second gaps. Also, a coil is arranged to develop a second magnetic field passing between the first and second pole pieces by way of the first gap and the rotor, the reluctance of the path of the first magnetic field being substantially greater than that of the second field.*

This invention relates to a rotational electro-mechanical transducer of the type adapted for limited angular movement. More particularly, it relates to an electromagnetic motor whose armature is of unpolarized magnetic material.

This is a continuation-in-part of my copending application Serial No. 104,943, filed April 24, 1961, entitled "Electric Motor for Limited Rotation."

Motors designed for limited angular movement, as opposed to ordinary motors capable of an unlimited number of revolutions, are used in various applications such as torque motors for servovalves, as well as electric meter movements, including movements which control the position of a recording pen instead of a dial pointer. In these devices, the armature generally rotates against a spring, and the amount of rotation is limited by the reaction torque of the spring which opposes the torque developed by the motor. The motor torque is a function of the current passed thrugh the motor.

It is generally desirable that rotation of the armature be linearly related to input current, and this requires a similar relationship between motor torque and current, assuming linearity of the restraining spring. The d'Arsonval movement, a moving coil device, fits this requirement and has therefore found wide use in limited rotation devices. In fact, its use in direct-current meters has been almost universal. However in the present day trend to miniaturization, the d'Arsonval movement has been an obstacle, mainly for two reasons. The first is the size required for a given output torque, and the second is the fairly high input current required for a substantial torque in a motor having a reasonably high frequency response.

Accordingly, it is an object of my invention to provide an improved electric motor of the type adapted for limited rotation.

A further object of my invention is to provide a motor of the above type in which the electrically produced torque is a linear function of input current and substantially independent of the angle of rotation over a substantial range of angular displacement.

Another object of the invention is to provide a motor of the above type in which the electrically produced torque is a linear function of input current and substantially independent of the angle of rotation over a substantial range of angular displacement.

Another object of the invention is to provide a motor of the above type having a high efficiency of conversion of electrical energy into mechanical output and particularly a motor that is characterized by low hysteresis losses.

A still further object of the invention is to provide a motor of the above type having a high torque-to-moment of inertia ratio for the armature.

Yet another object of the invention is to provide a motor of the above type having a relatively small size and thus adapted for use in miniaturized equipment.

A further object of my invention is to provide a motor of the above type having means for sensing the velocity of armature rotation for use in servocontrol of the motor.

Other objects of the invention will in part be obvious and will in part appear hereinafter.

The invention accordingly comprises the features of construction, combinations of elements and arrangements of parts which will be exemplified in the constructions hereinafter set forth and the scope of the invention will be indicated in the claims.

For a fuller understanding of the nature and objects of the invention, reference should be had to the following detailed description taken in connection with the accompanying drawings, in which.

In general, my motor has an armature of low reluctance material such as soft iron, journalled for rotation about an axis parallel to a pair of stationary poles disposed on diametrically opposite sides of the armature. A permanent magnet supplies a static field passing from one pole to the other through the armature. At least one of the poles is split, with a slot extending parallel to the armature axis and dividing the pole into a pair of pole pieces. The armature extends across this gap and is thus disposed opposite a part of each of the pole pieces.

Current through a control coil mounted on the stator develops a magnetic field extending from one of the pole pieces into the armature and back into the other of the pole pieces. Thus, depending on the direction of current, the control field developed by the coil adds to the static field on one side of the slot and subtracts from it on the other side. In accordance with well-known principles, the armature becomes subjected to a force in the direction of the stronger field.

I have also found that linearity of the motor can be enhanced by proper shaping of the armature. As described below, the shaping may, in its simplest form, consist of a notch or slot in the armature.

Figure 1:
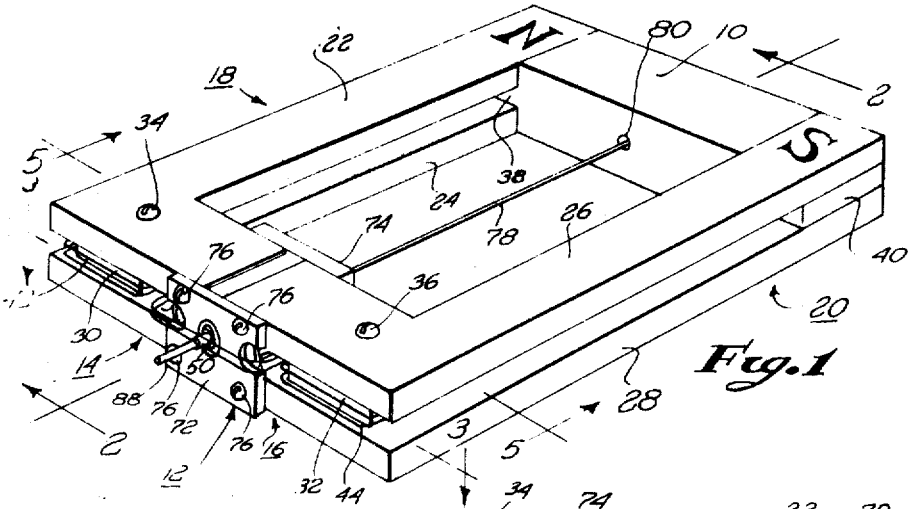
FIGURE 1 is a perspective view of a motor embodying my invention.

In FIGURE 1, I have illustrated a motor having a permanent magnet 10 connected to pass a static magnetic field through an armature assembly generally indicated at 12. The assembly 12 is disposed between poles 14 and 16, connected to the magnet 10 by flux carriers generally indicated at 18 and 20. The carriers 18 and 20, which comprise arms 22, 24, 26, and 28 of soft magnetic material, are magnetically connected by posts 30 and 32 respectively. The arms and posts are held together by screws 34 and 36, which also serve to clamp end tabs 38 and 40 of the magnet 10 between the arms in a dovetail arrangement. The motor also includes control coils 42 and 44 around the posts 30 and 32 and a velocity pickoff coil 46 extending generally around the armature assembly 12.

Figure 5:
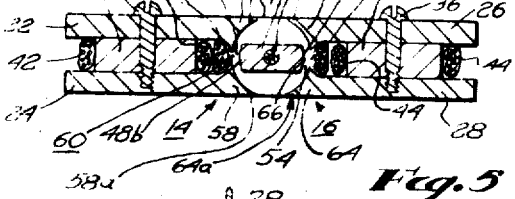
FIGURE 5 is a section taken along line 5—5 of FIGURE 1, and FIGURES 6–9 are simplified perspective views of further embodiments of my invention, [and]
Figure 4:
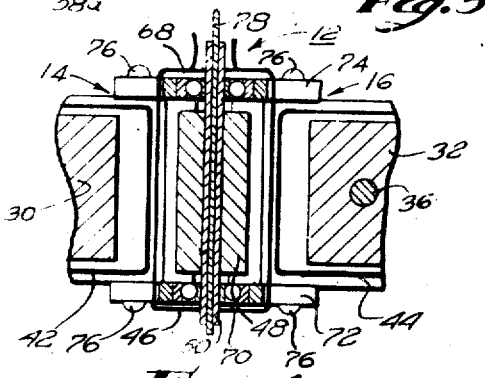
FIGURE 4 is an enlarged view of the rotor and associated parts, as seen in FIGURE 3.

More specifically, as seen in FIGURES 4 and 5, the armature assembly 12 includes an elongated armature 48 extending the width of the poles 14 and 16 and mounted for rotation with a tubular shaft 50. The armature 48 is generally flat, with arcuate sides closely spaced from concentric faces of the poles 14 and 16 by air gaps 52 and 54, respectively. The pole 14 includes pole pieces 56 and 58, formed on the ends of the arms 22 and 24 and separated by a slot 60, while the pole 16 has pole pieces 62 and 64 separated by a slot 66. The gaps 52 and 54 are much narrower than the slots 60 and 66, and they are also substantially narrower than the spaces between the projecting tips 56a and 62a and 58a and 64a of the poles 14 and 16. Thus when currents are passed through the coils 42 and 44, substantially the entire field of each coil passes from one pole piece associated with the coil into the armature 48 and then returns to the other pole piece on the same pole. For example, the path for the field created by current through the coil 44 extends through the post 32, arm 26, pole piece 62, armature 48 and back through the pole piece 64 and arm 28 to the post 32. The direction of this field, of course, depends on the direction of current flow in the coil.

As best seen in FIGURE 4, the shaft 50, which may be brazed to the armature 48, rotates in frictionless bearings 68 and 70 supported by plates 72 and 74. The plates 72 and 74, which are of non-magnetic material, are mounted on the arms 22–28 by means of screws 76.

Figure 2:
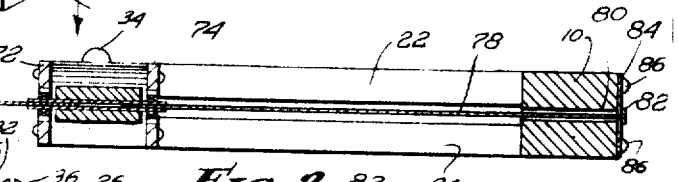
FIGURE 2 is a section taken along line 2—2 of FIGURE 1.
Figure 3:
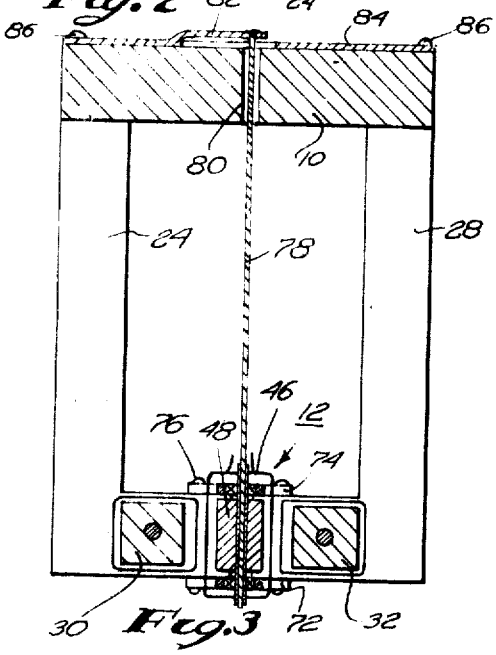
FIGURE 3 is a section taken along line 3—3 of FIGURE 1.

A reaction force opposing rotation of the armature from its neutral position (as shown in FIGURE 5) is provided by a torsion spring in the form of a wire 78, best seen in FIGURES 2 and 3. One end of the wire 78 is brazed in place in the tubular shaft 50, and the other end passes through a clearance hole 80 in the magnet 10 where it is brazed to a spring arm 82 integral with a bracket 84. The bracket, in turn, is affixed to the rear of the motor by screws 86 threaded into the ends of the arms 22–28. The arm 82, which is stiff in the direction of rotation of the wire 78, is relatively compliant in the axial direction. Thus, it is easly bent resiliently toward the magnet 10. The bending which occurs during rotation of the armature 48 from its neutral position compensates for the shortening of the wire 78 which follows the twisting thereof by movement of the armature. In this manner, essentially the only force imposed on the wire 78 is a torsional one, and the reaction torque exerted on the armature by the wire is therefore directly proportional to the angular displacement of the armature.

As seen in FIGURE 1, a shaft 88, which may carry a pointer or pen, depending on the use of the motor, is suitably secured in the front end of the tubular shaft 50.

The operation of the motor may be comprehended by reference to FIGURE 5, remembering that, as noted above, the permanent magnet 10 projects a static field from the pole 14 to the pole 16 by way of the armature 48. The static flux in the gaps 52 and 54 does not depend on the angular position of the armature 48, since, if the armature is rotated, the area of the gap 52 adjacent to the pole piece 56 changes at the same rate as the area adjacent to the pole piece 58, and, therefore, the total area of the gap remains unchanged. Similarly, the area of the gap 54 is independent of armature position, and thus the reluctance of the path for the static flux is invariant.

Next, consider the passage of current through the coil 44. Since the permanent magnet 10 (FIGURE 1) has a reluctance approaching that of air, the entire control field developed by this current will, as pointed out above, pass back and forth through the gap 54 by way of the pole pieces 62 and 64 and armature 48. With one direction of current through the coil 44, this field will add to the static field in the portion of the gap 54 adjacent to the pole piece 62 and subtract from the static field in the portion of the gap adjacent to the pole piece 64. Thus, the net field in the gap 54 is greater adjacent the pole piece 62 than adjacent the pole piece 64. Furthermore, the magnetic energy in the gap 54 increases with counterclockwise rotation of the armature 48, since the latter then "covers" more of the pole piece 62 and less of the pole piece 64. In accordance with well-known principles, this results in a pull of the side of the armature around toward the pole piece 62 i.e., a counterclockwise torque on the rotor 48.

At the same time, current through the coil 42 projects a field whose path includes the arm 22, pole piece 56, gap 52, armature 48 and finally back through the gap 52 to the pole piece 58, arm 24 and post 30. The coils are connected so that when the field developed by the coil 44 has the direction given above, the field from the coil 42 is in the same direction as the static field in the portion of the gap 52 opposite the pole piece 58 and opposite to the static field in the portion opposite the pole piece 56. Thus, the total field in the gap 52 is greater adjacent the pole piece 58, and there is a counterclockwise pull on the side 48b of the rotor 48. The torque is to a large degree independent of the angle of rotation as long as the side 48b is opposite portions of both the pole pieces 56 and 58 and there are currents through both coils 42 and 44.

It will be apparent that reversal of the direction of current through the coils 42 and 44 reverses the direction of rotor torque, and, more specifically, it provides a clockwise torque on the rotor 48.

Operation of the velocity coil 46 will now be described with reference to FIGURE 5.

First, consider the static field passing from the pole 14 to the pole 16. When the armature is in its neutral position, this field divides equally between the pole pieces 56 and 58 on the one hand and the pole pieces 62 and 64 on the other. Thus none of the static fields link the coil 46. However, if the armature 48 is rotated slightly, e.g., in the counterclockwise direction, the reluctance in the portion of the gap 52 adjacent to the pole piece 58 will be less than the reluctance in the portion adjacent to the pole piece 56. Similarly, the reluctance in the portion of the gap 54 adjacent to the pole piece 62 will be less than the reluctance in the portion adjacent to the pole piece 64. Thus, although the total static flux remains the same, a greater portion of it will pass from the pole piece 58 than from the pole piece 56 and likewise a greater portion will enter the pole piece 62 than the pole piece 64. In other words, there is a net flux passing through the coil 46 in the upward direction (FIGURE 5). In accordance with the well-known relationship, $$e = n\frac{d\phi}{dt}$$

a voltage is induced in the coil 46. Since the change in static flux linking the coil 46 is linear with angular displacement of the armature 50, the voltage induced in this coil by such flux change is proportional to the velocity of the armature. Its polarity depends upon the direction of motion of the armature.

The above construction provides greater torque than prior units having the same size and armature mass. Furthermore, as pointed out above, its operation is linear, and also hysteresis is low. The effect of hysteresis can, of course, be largely eliminated by the use of dither, a well-known technique. Another advantage stems from the fact that all the coils are stationary. Thus, a large number of turns may be used in the control coils to match a high impedance source without increasing the mass of the moving member. Also, heat may be conducted away from the stationary coils much more readily than from moving coils, which are effectively thermally insulated from suitable heat sinks.

The use of the permanent magnet 10 (FIGURE 1) to provide a high reluctance path between the flux carriers 18 and 20 deserves some explanation. If an electromagnet having a high permeability core were used, there would be a low reluctance path between the arms 26 and 28 and a similar path between the arms 22 and 24. Thus, the above-described flux paths for the control coils 42 and 44 woud be "short-circuited," and there would be essentially no control flux in the armature 48 (FIGURE 5). In other words, the motor would not operate.

This deficiency might be alleviated somewhat by splitting the core of the postulated electromagnet, i.e., providing a high permeability bar connecting the arms 22 and 26 and a second bar, separated from the first one, connecting the arms 24 and 28. However, a study of the flux paths resulting from this arrangement leads one to the conclusion that its operation is not as efficient as the one described above, and, particularly, hysteresis losses will be greater, since flux developed by the control coils 42 and 44 will pass around the entire magnetic circuit of the motor. However, in some applications, the disadvantages may be more than offset by the ability to use an electromagnet for the static flux, and, therefore, I include within the ambit of my invention motors of this type.

Figure 6:
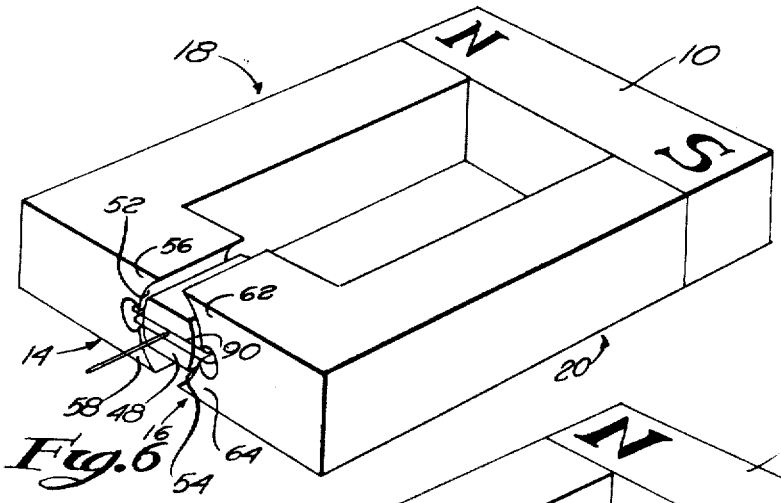

In FIGURE 6, I have illustrated another embodiment of my invention in which a single control coil 90 extends around the armature in a plane between the pole pieces 56 and 62 on one hand, and the pole pieces 58 and 64 on the other hand. Assuming a current through the coil 90 which develops an upwardly directed control field in the armature 48, this field will pass outwardly from the armature to the pole pieces 56 and 62 and inwardly toward the armature from the pole pieces 58 and 64. If the static field from the magnet 10 passes through the armature 48 from left to right, the control field will add to the static field in the gap 52 adjacent to the pole piece 58 and in the gap 54 adjacent to the pole piece 62. It will subtract from the static field in the gap 52 adjacent to the pole piece 56 and in the gap 54 adjacent to the pole piece 64. Thus, it will be apparent that operation is in the manner described above.

It will be also be apparent that, since the coil 90 of FIGURE 6 operates in a similar manner to the coils 42 and 44 of FIGURE 1, the latter coils can be used as velocity sensors in the manner described above, with the coil 46 operating as an input coil. Furthermore, a second coil, overlapping the coil 90, can be used for velocity feedback; similarly, a pair of coils around the same flux paths as the coils 42 and 44 can be used for this purpose.

Figure 8:
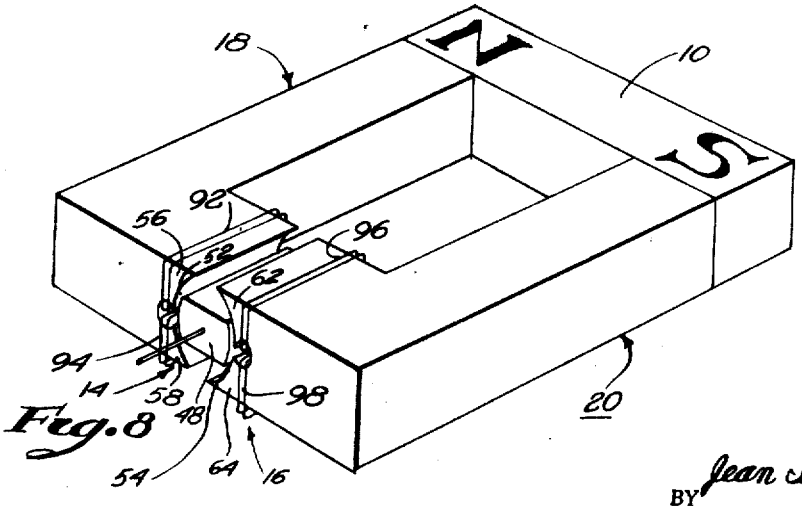

The motor illustrated in FIGURE 8 also operates in the above manner. Four control coils 92–98, wound around the respective pole pieces, are connected to provide a control field pattern identical to that of the motor of FIGURES 1–5. Velocity information may thus be obtained by means of a coil extending around the rotor in a manner similar to that of the coil 46 of FIGURES 1 and 2. Alternatively, it will be noted from the above description that either of the control coils 42 or 44 alone will provide rotor torque. Therefore, one of the coil pairs in FIGURE 4, e.g., 96–98, may be used as control coils, with the coils 92 and 94, either singly or in series, serving as velocity pickoff coils. In fact, a single one of the control coils 92–98 will serve to drive the rotor, with one or both of the coils on the opposite pole providing velocity information.

However, in general, it is preferable to have at least two control coils, one on the pole 14 and one on the pole 16. If control coils are used on only one of the poles, they must develop twice the field required for two-pole operation. This, in turn, necessitates a stronger magnet 10, since the static field must be at least equal the strongest control field. Furthermore, with a stronger control field associated with one pole, the cross sectional areas associated with the path of the control field must be larger to prevent saturation and reduce hysteresis. This results in a bulkier, heavier device.

Figure 7:
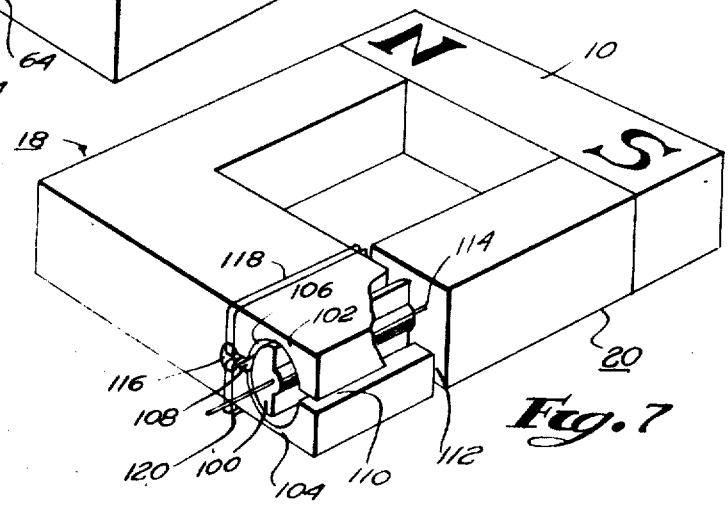

The motor illustrated in FIGURE 7 is particularly well adapted for use in situations where the axis of rotation must be close to one edge of the unit. A [hemispheric] *hemicylindrical* rotor 100 is separated from [hemispheric] *hemicylindrical* pole pieces 102 and 104 by a gap 106. The pole pieces 104 and 102, which are separated by slots 108 and 110, are extensions of the flux carrier 18 and thus at the same potential as regards the static flux from the magnet 10. A gap 112 separates the pole pieces 102 and 104 from the flux carrier 20. The rotor 100, which is considerably closer to the flux carrier 20 than are the pole pieces, is also preferably magnetically linked to the flux carrier 20 by means of a shaft 114 of magnetic material. Thus essentially all of the static flux passes through the rotor 100.

Still referring to FIGURE 7, the slot 108 is preferably enlarged at its inner end, as indicated at 116, to admit a pair of control coils 118 and 120 wound around the pole pieces 102 and 104, respectviely. The coils 118 and 120 are connected so that, insofar as the magnetic fields developed by them are concerned, they are in a series-aiding relationship. Thus, they develop a field passing from the flux carrier 18, through one of the control coils, through the gap 106 and into the rotor 100. The control field then passes from the rotor 100 back through the gap 106 and the other of the control coils and into the flux carrier 18. The static field from the magnet 10 is independent of rotor orientation, although the distribution of this field between the pole pieces 102 and 104 does, of course, depend on the angle of the rotor. Accordingly, operation of the motor of FIGURE 7 is similar to that of the motors described above. In this connection, it will be noted that the motor will operate with either of the coils 118 or 120 alone.

Figure 9:
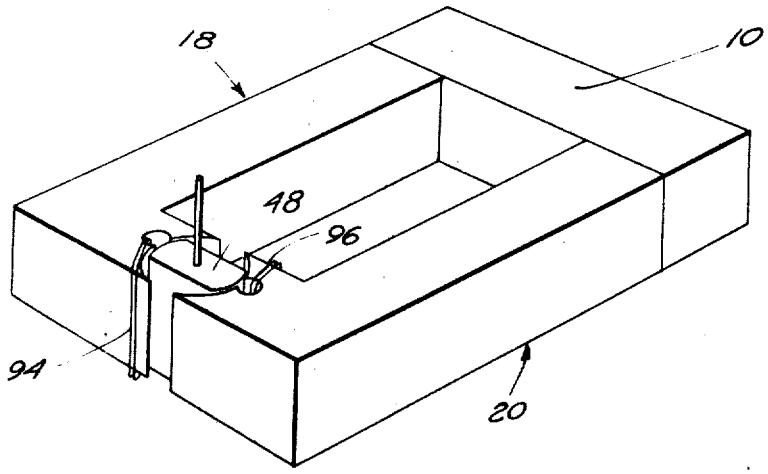

In FIGURE 9 I have illustrated a modification of the motor of FIGURE 8, with the rotor 48 mounted for rotation about an axis perpendicular to the common plane of the magnet 10 and flux carriers 18 and 20. By way of illustration, only the control coils 94 and 96 have been included in FIGURE 9, although, from the above, it will be apparent that fewer or more coils may be utilized.

It will be noted that in FIGURES 6–9, the flux carriers 18 and 20 are not split into separate arms as in FIGURE 1. This because, with the control coil arrangement in FIGURES 6–9, there is no problem of magnetic "short-circuiting" by the flux carriers. Furthermore, the magnet 10 may be an electromagnet in these embodiments, although a permanent magnet having a high internal reluctance is preferred for the reasons given above.

Since mechanical output of above motors results from the interaction of magnetic fields—more specifically the torque is proportional to the produce of the field strengths—the functions of the sources of the fields may be interchanged. Thus, the control coils may supply the static fields, and the magnets 10 the control fields. However, the problems of magnetic "short circuiting" discussed above still exists, and for this as well as other reasons, it is generally preferable to have the magnet 10 supply the static field.

Figure 10:
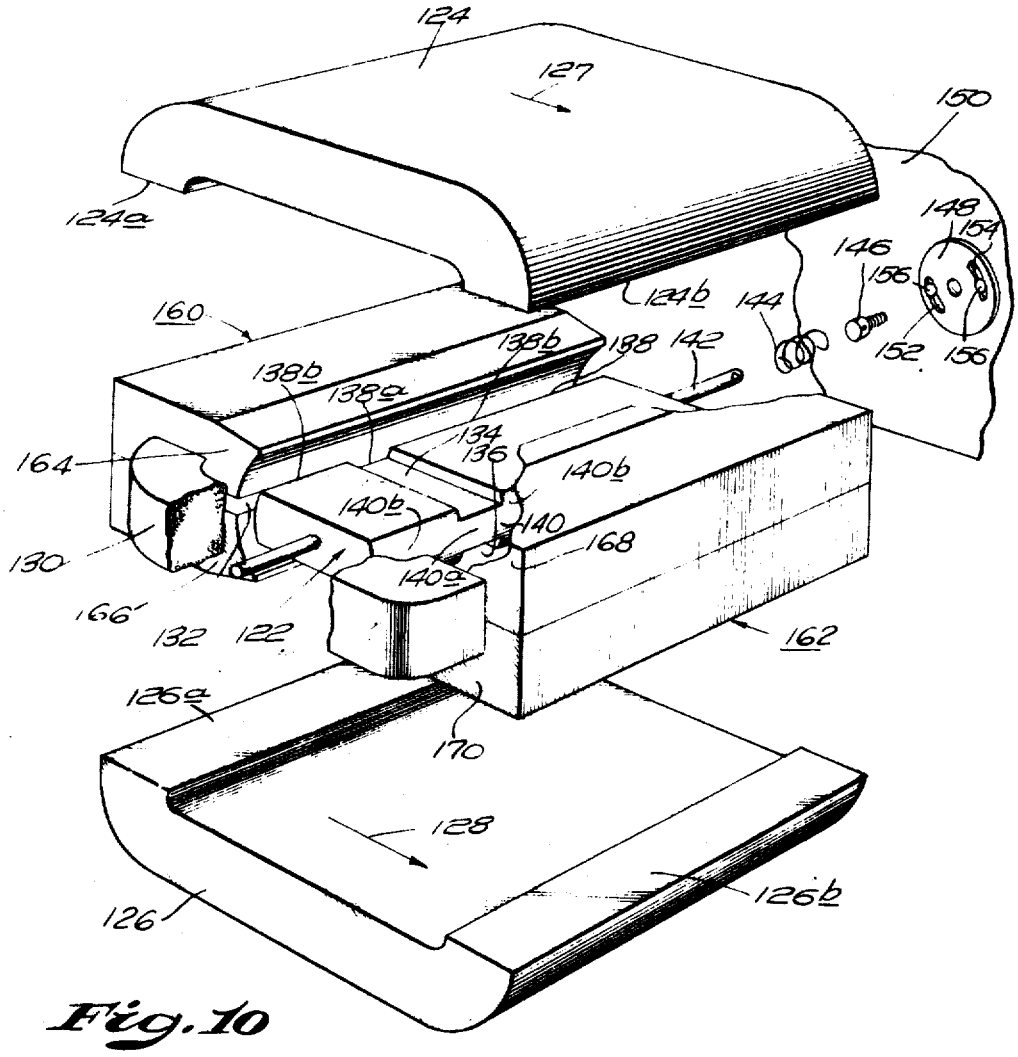
FIGURE 10 is an exploded view of a further embodiment of my invention, *and*

In FIGURE 10, I have illustrated a construction which is characterized by its compactness and is thus highly suitable for application having stringent space requirements. The motor includes a pair of poles, generally indicated at 160 and 162, comprising pole pieces 164, 166, 168 and 170. An armature generally indicated at 122 is disposed between the poles 160 and 162 in a manner similar to that of FIGURE 6, for example. The poles 160 and 162, which are elongated in the direction of the axis of rotation of the armature 122, also serve as flux carriers for permanent magnets 124 and 126. The magnets 124 and 126 generate magnetic fields in the same direction with respect to the poles 160 and 162, as indicated by the arrows 127 and 128.

A coil unit 130, comprising both a control coil and a separate velocity pickoff coil, extends through longitudinal apertures in the poles 160 and 162 and around the ends of the armature 122 in the [*manner*] of the coil 90 of FIGURE 6. These apertures, together with slots 132, separate the pole pieces 164 and 166 and the pole pieces 168 and 170.

With further reference to FIGURE 10, a single one of the magnets 124 and 126 may be used, but it is preferable to use two of them as illustrated. In the first place, with the preferred construction the static flux from the permanent magnet is distributed evenly among the pole pieces 164–170 whereas with a single permanent magnet this will generally not be the case, and linearity of operation will suffer. Moreover the total flux obtainable from a permanent magnet is dependent on its cross-sectional area, in the illustrated configurations proportional to the area of the pole faces 124a and 124b, 126a and 126b. If a single magnet were used it would therefore have to be thicker than either of the magnets 124 and 126. With the greater area thus required for the magnet pole faces, the motor would have to be wider or longer for an equivalent static magnetic field. That is, the overall size of a motor of equivalent torque will generally be greater with a single permanent magnet than with two.

The compactness of the embodiment of FIGURE 10 as compared with that of FIGURE 1, for example, is due to the disposition of the permanent magnets 124 and 126 in direct contact with the poles 160 and 162. This eliminates the flux carriers 18 and 20 which contribute to the bulk of the motor.

The armature 122 is notched or cut away to form grooves 134 and 136 extending across the flat surfaces of the armature and between the curve surfaces 138 and 140 conforming to the arcuate pole pieces 164–170. This construction enhances the linearity of operation. As pointed out above, the torque exerted on the armature is substantially independent of the angle of rotation, as long as the surfaces 138 and 140 bridge the slots 132 between the pole pieces 164 and 166 on one side and the pole pieces 168 and 170 on the other side of the motor. However, I have found that there is a slight decrease in torque when the angle of rotation deviates substantially from the neutral position, i.e. in which the armature overlaps the two pole pieces of each pole in equal amounts. While this departure from the ideal characteristic is so small as to be of little or no consequence in many applications, there are some cases where a higher degree of linearity is desirable.

The increased linearity is due to the fact that, as the armature 122 rotates to the point where the non-linearity becomes significant, the reduced portions 138a and 140a of the surfaces 138 and 140 no longer overlap both pole pieces of the pole 160 and 162. For example, assuming clockwise rotation of the armature 122, as viewed from the left-hand end thereof in FIGURE 10, when the rotation reaches the point where the aforementioned non-linearity becomes significant, the surface portion 138a will overlap only the pole piece 164 and the slot 132 adjacent thereto and similarly, the portion 140a will overlap only the pole piece 170 and the slot adjacent to it. The reduced portions no longer overlap the pole pieces 166 and 168, respectively. When this occurs, there is a substantial increase of the pull of the pole pieces 164 and 170 on the portions 138a and 140a with respect to the pull exerted on these portions by the pole pieces 166 and 168. Furthermore, the increase continues with further rotation almost to the point where the reduced surface portions 138a and 140a are entirely opposite the pole pieces 164 and 170.

This follows from the fact that when an arcuate surface of an armature is opposite both adjacent pole pieces, e.g., when the surface 138 of the armature 122 is opposite both the pole pieces 164 and 166, the magnetic field between the armature and each of the pole pieces exerts a torque on the armature. These torques are in opposite directions, and the armature rotates in the direction of the predominant torque, as determined by the current through the control coil in the coil unit 130. The net torque on the armature, i.e., the difference between these torques, is substantially independent of armature position, except for the non-linearity noted above, as long as the surface of armature is opposite both adjacent pole pieces.

However, when it leaves one of the pole pieces and is opposite only the other one, the relationships between the various parameters of the system tending toward linearity no longer exist. Rather, the relationship between the surface 138 and the pole piece 164 is more like that of a solenoid, where the force exerted by the system increases as the reluctance of the air gap decreases, that is, as the armature and the stator comes closer toegther. Because of the reduced thickness of the surface portion 138a, this increase in torque on this surface portion occurs while the wider (in arcuate extent) portions 138b still overlap both the pole pieces 164 and 166. In particular, the reduction in the surface portion 138a relative to the portions 138b is such as to provide the increased torque on the portion 138a as the portions 138b encounter the decrease in torque which otherwise results in the non-linearity overcome by this construction.

There is a similar relationship between the reduced portion 140a of the surface 140 and the wide portions 140b thereof.

By way of example, the relationship between the wide surface portions 138b and 140b and the slots 132 may be such that the wide portions overlap both the pole pieces adjacent thereto up to a rotation of 15° from the neutral position; and each of the reduced portions 138a and 140a overlap both the pole pieces adjacent thereto up to an angle of 10° on either side of the neutral position. The relative lentghs (in the axial direction) of the reduced and wide portions depend on the amount of the non-linearity to be compensated for: the increased torque due to a reduced portion increases with the lentgh of the portion. When small amounts of non-linearity are to be compensated, a groove such as 134 or 136 having a rectangular cross section, is adequate. If a greater range of rotation is to be linearized, the slot may have a different cross section. In the ultimate, there may be a continued taper from the wide surface portions of the armature to reduced portion thereof. It will be appreciated that because of fringing eflects, etc., there will generally be some empirical correction to arrive at the exact amount of cutting away of the armature required in a given motor size.

It will be noted that it is not necessary that both the surface 138 and 140 have reduced portions. Rather, the motor could be provided with only one of these portions, for example the portion 140a, although in that case it would be longer, i.e., in the axial direction, than either of the two reduced portions 138a and 140a illustrated. However, generally it will be easier to form the grooves 134 and 136 extending all the way across the armature 122 than merely notch the armature adjacent to one of the surfaces 138 and 140. For this reason, it is preferable to construct the armature with the two reduced surface portions.

Moreover, it is generally desirable that the depth of the grooves 134 and 136 be equal in order to obtain symmetry of operation of the motor. That is, with equal depths and equal widths of the two grooves, the response of the motor when rotating in one direction from its neutral position, is the same as in the other direction of rotation. On the other hand, it will be apparent, that when rotation in only one direction from the neutral axis is contemplated, the grooves corresponding to enhancement of linearity in the opposite direction may be omittted.

By analogy, it will be apparent that the enhancement of linearity can be accomplished by reducing the arcuate extent of portions of the pole pieces 164–170. For example, the slot 132 might be widened along portions thereof.

The motor illustrated in FIGURE 10 also includes a shaft 142 extending through the armature 122 and fastened to one end of a helical spring 144, which provides the restoring force for the armature. The other end of the spring is secured to a screw 146 which is threaded into a disk 148. The disk, in turn, is rotatably secured to the end wall of a housing fragmentarily shown in 150.

Figure 10A:
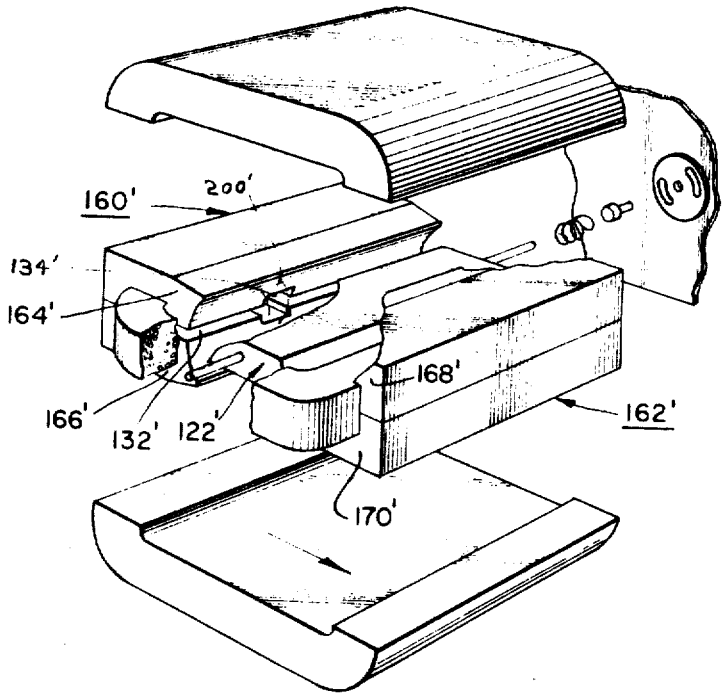
*FIG. 10a is a fragmentary view of another embodiment of the invention.*

*FIG. 10a illustrates a motor which is the same as the one depicted in FIG. 10, except that the armature 122' is not grooved to form surface portions of lesser arcuate extent. Rather, the pole pieces 164', 166', 168' and 170' have surface portions 200' which are of lesser arcuate extent. This is done by widening each slot 132' at 134' along a portion of its length.*

More specifically, the disk 148 is provided with arcuate hoes 152 and 154. Bolts 156 extend through the slots and the housing 150. When the bolts are tightened, the disk 148 is secured in position. The angular position of the disk may be adjusted after assembly of the motor by loosening the bolts, and in this manner the neutral position of the spring 144 and the magnetic system within the motor may be made to coincide.

The motor of FIGURE 10 is fabricated by first forming the coil unit 130 and the four pole pieces 164–170, which may have identical shapes and are separately formed. The pole pieces are then emplaced about the coil unit and cemented together to form the poles 164 and 170. The magnets 124 and 126 are cemented to the poles 164 and 170. A round mandrel (not shown) taking the place of the armature 122, is used to position the poles during the cementing and potting operation. The cemented parts are placed in housing 150, and the unit is then potted, after which the mandrel is removed. A minor boring or reaming operation may be required at this point to provide the requisite clearance for the armature 122 and ensure concentricity of the pole pieces and the armature surface 138 and 140.

It is generally desirable to use a mandrel which is slightly smaller in diameter than the ultimate diametrical distance between the pole pieces, in order to make sure that some material is removed from each pole piece by the reaming step.

The armature 122 is then inserted, after having been secured to the springs 144 and 146, and these parts are rotated to fasten the screw to the disk 148. A front cover (not shown) including a bearing unit which may be similar to the bearing 70 shown in FIGURE 4, is then secured to the housing and final adjustment of the disc 148 is made.

From the steps used to fabricate the motor of FIGURE 10, it is apparent that this motor not only has the compactness and linearity described above, but also is relatively easy to fabricate. Moreover, the armature has a relatively low moment of inertia, because of its small diameter as compared with its length.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention therein described, and all statements of the scope of the invention which, as a matter of language, might be said to fall therebetween.

I claim:

1. A motor comprising, in combination, a rotor mounted for rotation about an axis, first and second poles each of which has a pole face describing in section an arc of a circle having its center on said axis, said rotor having a first surface closely radially spaced from said face of said first pole by a first gap and a second surface closely radially spaced from said face of said second pole by a second gap, each of said first and second surfaces of said rotor describing in section an arc of a circle whose center is on said axis, means forming a third gap axially extending in said face of said first pole to divide it into first and second pole pieces, said first surface of said rotor extending across said third gap to be opposite both said first and second pole pieces, a first magnet connected between said first and second poles so as to pass a first magnetic field through said rotor by way of said first and second poles and said first and second gaps, a coil arranged to develop a second magnetic field passing between said first and second pole pieces by way of said first gap and said rotor, the reluctance of the path of said first magnetic field being substantially greater than that of said second field.

2. The combination defined in claim 1 in which said first and second pole pieces are portions of first and second flux arms extending between said first gap and said magnet, said arms being magnetically isolated from each other except for a magnetic link therebetween, said coil being disposed around said link.

3. The combination defined in claim 1 including a fourth gap extending axially in said face of said second pole so as to divide it into third and fourth pole pieces and means for passing a magnetic field through said rotor by way of said third and fourth pole pieces and said second gap, said second surface of said rotor extending across said fourth gap to be opposite both said third and fourth pole pieces.

4. The combination defined in claim 3 including a coil extending around said rotor in a plane parallel to said axis and intersecting said pole faces.

5. The combination defined in claim 3 in which said first and second pole pieces form the ends of first and second flux arms extending from said first gap to a first pole of said first magnet, said third and fourth pole pieces being on the ends of third and fourth flux arms extending between said second gap and the other pole of said first magnet, the relative reluctances of the various flux paths in said motor being such that substantially the entire field developed by current in said coil passes through said rotor by way of sad first and second pole pieces and said first gap.

6. A motor comprising, in combination, a rotor of soft magnetic material mounted for rotation about an axis between first and second poles with first and second gaps radially between said rotor and said poles, a first magnet, flux carrying means extending between said poles and the respective poles of said first magnet, means forming third and fourth gaps in said poles extending axially therealong and opening into said first and second gaps, said third and fourth gaps dividing the faces of said poles into pole pieces, and a stationary coil disposed in a plane substantially parallel to said axis, said coil passing around said rotor and axially through said third and fourth gaps, each of said first and second gaps extending circumferentially about said axis for a distance less than the circumferential extension of the pole adjacent thereto, said rotor having a pair of opposed arcuate surfaces defining said gaps, each of said surfaces extending across said third gap to be opposite a pair of adjacent pole pieces, the path for the flux from said first magnet having substantially greater reluctance than the flux path extending through said coil and passing through said rotor and one of said first and second gaps and the pole adjacent thereto and returning to said rotor through the same gap.

7. A motor comprising, in combination, a rotor of magnetic material mounted for rotation about an axis between first and second poles with first and second gaps radially between said rotor and said poles, a first magnet, flux carrying means extending between said first and second poles and the respective poles of said first magnet, means forming third and fourth gaps in said poles extending axially therealong and opening into said first and second gaps, whereby said third gap divides said first pole into first and second pole pieces and said fourth gap divides said second pole into third and fourth pole pieces, the circumferential order of said pole pieces being: first, second, third and fourth, a first coil extending around said first pole piece and a second coil extending around said third pole piece, said first and second coils passing through said third and fourth gaps respectively, said rotor having a pair of diametrically opposed arcuate surfaces defining said first and second gaps, each of said surfaces spanning one of said third and fourth gaps to overlap a pair of circumferentially adjacent pole pieces the path for flux from said first magnet having substantially greater reluctance than the flux path extending through said first coil and passing through said rotor and said first gap and the pole adjacent thereto and returning to said rotor through said first gap, and the path for the flux of said first magnet having substantially greater reluctance than the flux path extending through said second coil and passing through said rotor and said second gap and the pole adjacent thereto and returning to said rotor through said second gap.

8. The combination defined in claim 7 including third and fourth coils around said second and fourth pole pieces, respectively.

9. An electric motor comprising, in combination, first and second magnetic poles, a rotor mounted for rotation about an axis, said first pole having a face extending in the axial direction of said rotor and closely radially spaced from said rotor to define a first air gap, a second gap extending axially in said pole face and opening into said first gap, whereby said second gap divides said first pole into first and second pole pieces, said rotor being so shaped that it overlaps both said first and second pole pieces and rotation about said axis increases the portion of said first gap opposite one of said pole pieces and decreases the portion thereof opposite the other of said pole pieces, a magnet, a first flux arm magnetically connecting said first pole to one of the poles of said magnet, a second flux arm extending between the other pole of said magnet and an axial end of said rotor, said second flux arm being spaced from said first pole, the portion of said second arm adjacent said rotor being said second pole of said motor, and a coil extending around said first pole piece and through said second gap the path for the flux from said magnet having substantially greater reluctance than the flux path extending through said coil and passing through said rotor and said first gap and said first pole and returning to said rotor through said first gap.

10. The combination defined in claim 9 including a second coil extending around said second pole piece and through said second gap.

11. A motor comprising, in combination, a rotor mounted for rotation about an axis, said rotor having first and second diametrically opposed arcuate surfaces forming part of a cylinder concentric with said axis, said surfaces being diametrically opposed with respect to said axis and defining between them the longest dimension of said rotor perpendicular to said axis, first and second poles disposed opposite the respective arcuate surfaces of said rotor with first and second gaps radially between said poles and said rotor, said first pole having first and second pole pieces spaced apart by a first further gap in the direction of rotor rotation, first low reluctance means connecting said first and second pole pieces together, said second pole having portions opposite said first and second pole pieces, second low reluctance means connecting together said portions of said second pole, a first magnet connected between said first and second poles, magnetic means positioned to develop a magnetic field along a loop consisting of said rotor, said first pole piece, said second pole piece and the low reluctance means connecting said first and second pole pieces, said first surface of said rotor extending across said first further gap to the opposite both said first and second pole pieces, the path for the flux of said first magnet having a relatively high reluctance so that substantially none of the field of said magnet means passes through said first magnet.

12. The combination defined in claim 11 in which said first magnet is a permanent magnet and in which said magnet means comprises an electromagnet coil.

13. The combination defined in claim 11 in which said portions of said second pole opposite said first and second pole pieces are third and fourth pole pieces spaced apart by a second further gap in the direction of rotor rotation, said motor including means for passing a magnetic field along a further loop consisting of said rotor, said third and fourth pole pieces and said second low reluctance means interconnecting said third and fourth pole pieces, said second surface of said rotor extends across said second further gap to be opposite both said third and fourth pole pieces.

14. The combination defined in claim 11 including a sensing winding disposed to develop a voltage in response to the change in the distribution of flux between the two pole pieces of each pole resulting from angular displacement of said rotor.

15. The combination defined in claim 13 including a winding disposed around said rotor and substantially symmetrical about a plane passing through, said axis of rotation and said first further gap.

16. The combination defined in claim 13 in which said first and second pole pieces form the ends of first and second flux arms extending from said first gap to a first pole of said first magnet, the relative reluctances of the various flux paths in said motor being such that substantially the entire field developed by said magnet means passes through said rotor by way of said first and second pole pieces and said first gap.

17. An electric motor for limited rotation, said motor comprising:

(a) a rotor of highly permeable magnetic material, (b) means mounting said rotor for rotation about an axis of rotation, (c) four pole pieces disposed in a circle centered on said axis, (d) said pole pieces being separated by slots, (e) each pole piece being paired with each of its circumferentially adjacent pole pieces, whereby said pole pieces form first, second, third and fourth pairs of pole pieces with said first pair excluding the pole pieces of said second pair, (f) said rotor having first and second arcuate surfaces centered on said axis and bridging a pair of said slots oppositely disposed with respect to said axis, whereby each of said arcuate surfaces overlaps a separate pair of said pole pieces, (g) a permanent magnet connected to impose a static magnetic potential difference between said first and second pairs of pole pieces, (h) electromagnetic means connected to develop a magnetic potential between said third and fourth pairs of pole pieces, and (i) at least one of said surfaces of said rotor having a reduced portion whose arcuate extent is substantially less than that of the remainder of said one surface [, thereby to enhance the linearity of operation of said motor].

18. The combination defined in claim 17 in which said reduced portion is symmetrical with respect to the remainder of said one surface in the circumferential direction thereof.

19. The combination defined in claim 17 including a velocity pickoff coil system connected to be linked by substantially the same flux as said electromagnetic means.

20. The combination defined in claim 17

(a) in which said permanent magnet is connected directly between the pole pieces of said third pair thereof and (b) including a second permanent magnet directly connected to the pole pieces of said fourth pair thereof, (c) said magnets being similarly polarized with respect to the pole pieces of said first pair.

21. An electric motor for limited rotation, said motor comprising (a) an armature mounted for rotation about an axis, (b) said armature having first and second surfaces which are (1) arcuate with respect to said axis, (2) oppositely disposed with respect to said axis, (c) first and second poles oppositely disposed with respect to said axis, (d) said first pole including first and second pole pieces having (1) first and second surfaces which are arcuate with respect to said axis, (2) first means magnetically connecting said first and second pole pieces, (3) said first and second pole pieces and said first magnetic connecting means defining a first slot extending radially from said first and second surfaces, (e) said second pole including third and fourth pole pieces having (1) third and fourth surfaces which are arcuate with respect to said axis, (2) second means magnetically connecting said third and fourth pole pieces, (3) said third and fourth pole pieces and said second magnetic connecting means defining a second slot extending radially from said third and fourth surfaces, (f) said first and fourth surfaces being diametrically opposed, (g) said second and third surfaces being diametrically opposed, (h) said first and third surfaces and said second and fourth surfaces defining third and fourth slots, respectively, extending radially with respect to said axis, (i) a first permanent magnet substantially coextensive with first and third pole pieces and extending between them, (j) a second permanent magnet substantially coextensive with said second and fourth pieces and extending between them, (k) said magnets being polarized in the same direction with respect to said poles, (l) a control coil extending through said first and second slots, (m) said surfaces of said armature bridging a pair of slots which are oppositely disposed with respect to said axis, whereby each of said armature surfaces overlaps a pair of said pole piece surfaces oppositely disposed with respect to the pair of pole piece surfaces overlapped by the other of said armature surfaces.

22. The combination defined in claim 21 including a second coil extending through said first and second slots.

23. The combination defined in claim 21 in which each of said rotor surfaces has a portion reduced in circumferential extent with respect to the remainder of said rotor surface [, thereby to enhance the linearity of operation of said motor].

24. The combination defined in claim 21 including (a) a housing containing said motor, (b) a shaft connected to said rotor and disposed on said axis, (c) a plate rotatably secured to said housing, and (d) a torsional spring connected between said shaft and said plate.

*25. An electric motor comprising*

*(A) first and second magnetic poles each of which has a pole face describing in section substantially an arc of a circle having its center on a common axis,*

*(B) means forming an axially-extending slot in said first pole face forming on said first pole first and second circumferentially spaced-apart pole pieces,*

*(C) a rotor mounted for rotation about said axis,*

*(D) said rotor having a third arcuate surface*

*(1) closely radially spaced from first and second pole face portions, said pole face portions consisting of the portion of said first pole face on said first pole piece and another circumferentially-adjacent portion of said pole faces, and*

*(2) opposite both said pole face portions when said rotor is in a neutral position,*

*(E) a first magnet connected between said first and second poles so as to pass a first magnetic field through said rotor by way of said first and second poles and the gaps between said rotor and said two poles,*

*(F) a second magnet arranged to develop a second magnetic field passing between said first and second pole pieces by way of said rotor and the gaps between said rotor and said first and second pole pieces,*

*(G) at least one of said first and second magnets being an electromagnet, and*

*(H) at least one of said third rotor surface and one pole face having an axially-extending portion of lesser arcuate extent than the rest of said surface or pole face,*

*(1) said reduced portion being so arranged that when said rotor is turned by a selected angle, the area of said rotor third surface opposite said first and second pole face portions at said reduced portion changes with rotation of said rotor relative to the area of said rotor third surface opposite said pole face portions elsewhere than at said reduced portion.*

*26. An electric motor according to claim 25 having at least one said portion of lesser arcuate extent so arranged that when said rotor is turned by said selected angle, the area of said rotor third surface opposite said first and second pole face portions at said one reduced portion increases with rotation relative to the area of said rotor third surface opposite said pole face portions elsewhere than at said one reduced portion.*

*27. An electric motor according to claim 25 in which said portion of lesser arcuate extent is formed by means reducing the arcuate extent of said third rotor surface.*

*28. An electric motor according to claim 25 in which said portion of lesser arcuate extent is formed by means reducing the arcuate extent edge of said first pole face on at least one of said first and second pole pieces.*

*29. An electric motor according to claim 28 in which*

*said reducing means is widening a lengthwise portion of said slot.*

*30. An electric motor for limited rotation, said motor comprising:*

*(A) a rotor element of magnetically permeable material,*

*(B) means mounting said rotor for rotation about an axis of rotation,*

*(C) a stator element comprising four pole pieces disposed in a circle centered on said axis,*

*(D) said pole pieces being separated by slots,*

*(E) each pole piece being paired with each of its circumferentially adjacent pole pieces, whereby said pole pieces form first, second third and fourth pairs of pole pieces with said first pair excluding the pole pieces of said second pair,*

*(F) said rotor element having first and second arcuate surfaces centered on said axis and at least when said rotor element is in a neutral position, bridging a pair of said slots oppositely disposed with respect to said axis, whereby each of said rotor arcuate surfaces normally overlaps a separate pair of said pole pieces,*

*(G) a permanent magnet connected to impose a static magnetic potential difference between said first and second pairs of pole pieces,*

*(H) electromagnetic means connected to a develop a magnetic potential between said third and fourth pairs of pole pieces, and*

*(I) at least one arcuate surface*

*(1) selected from*

*(a) one pole piece surface facing an arcuate rotor element surface, and*

*(b) one arcuate rotor element surface*

*(2) having a reduced portion of lesser axial length and of lesser arcuate extent than the remainder of said one surface, said reduced portion being so arranged that, when said rotor is turned by a selected angle, the area of said reduced portion of said one arcuate surface on one said motor element opposite the arcuate surfaces on said other motor element changes with rotation of said rotor element relative to the area of the remainder of said one arcuate surface opposite the arcuate surfaces on said other motor element.*

References Cited

The following references, cited by the Examiner, are of record in the patented file of this patent or the original patent.

UNITED STATES PATENTS

| | | | |
|---|---|---|---|
| 1,572,452 | 2/1926 | Thomas | 335—272 XR |
| 2,488,734 | 11/1949 | Mueller | 336—133 XR |
| 2,942,457 | 6/1960 | Sink | 310—15 XR |

FOREIGN PATENTS

| | | |
|---|---|---|
| 337,583 | 6/1921 | Germany. |
| 844,484 | 7/1952 | Germany. |
| 613,856 | 12/1948 | Great Britain. |
| 690,232 | 4/1953 | Great Britain. |

G. HARRIS, Primary Examiner

U.S. Cl. X.R.

310—15; 335—266

UNITED STATES PATENT OFFICE

CERTIFICATE OF CORRECTION

Patent No. Reissue No. 26,749 Dated January 6, 1970

Inventor(s) Jean I. Montagu

It is certified that error appears in the above-identified patent and that said Letters Patent are hereby corrected as shown below:

Column 10, line 65, "sad" should read -- said --. Column 12, line 21, "the" should read -- be --. Column 14, line 72, cancel "edge". Column 15, line 1, before "widening" insert -- means --.

Signed and sealed this 4th day of May 1971.

(SEAL)
Attest:

EDWARD M.FLETCHER,JR.
Attesting Officer

WILLIAM E. SCHUYLER, JR.
Commissioner of Patents